Dec. 7, 1943.  J. L. ADAMS, JR  2,335,895
WELDING APPARATUS
Filed June 18, 1930    5 Sheets-Sheet 1

Fig.1.

INVENTOR
James L. Adams Jr.
by Byrnes, Stebbins, Parmelee & Black,
his Attys.

Fig. 2.

Dec. 7, 1943.         J. L. ADAMS, JR         2,335,895
                      WELDING APPARATUS
                    Filed June 18, 1930        5 Sheets-Sheet 3

INVENTOR
James L. Adams Jr.

Dec. 7, 1943.    J. L. ADAMS, JR    2,335,895
WELDING APPARATUS
Filed June 18, 1930    5 Sheets-Sheet 4

INVENTOR
James L. Adams, Jr.

Dec. 7, 1943.   J. L. ADAMS, JR   2,335,895
WELDING APPARATUS
Filed June 18, 1930   5 Sheets-Sheet 5

Patented Dec. 7, 1943

2,335,895

UNITED STATES PATENT OFFICE 2,335,895

WELDING APPARATUS

James L. Adams, Jr., Youngstown, Ohio, assignor to The Youngstown Sheet & Tube Company, Youngstown, Ohio, a corporation of Ohio Application June 18, 1930, Serial No. 461,979

26 Claims. (Cl. 219—6)

The present invention relates broadly to the art of electric welding and more particularly to an improved welding apparatus suitable for the welding of substantially tubular material.

As pointed out in my co-pending application Serial No. 453,888 filed May 20, 1930, many advantages are obtainable by the use of a welding apparatus operating on the induction principle and in which the material being welded constitutes in effect a moving secondary for the coil by means of which the desired welding current is induced in such secondary. In accordance with the usual practice, the material to be welded is formed up from a suitable strip or plate into substantially tubular contour with the edges in adjacent but slightly spaced relationship.

The operation of an induction welding apparatus is necessarily such as to effect a maximum concentration of heat along the line of the proposed weld. The coil, which for electrical reasons is preferably closely adjacent the tubular material, is subjected to the greatest amount of heating adjacent this line. When it is considered that flash temperatures in the neighborhood of from 6000° to 7000° Fahrenheit are maintained along the line of weld, it will be obvious that the problem of adequately protecting the coil against the destructive action of the heat is a serious one. Efforts have been made to afford the necessary protection by means either of armoring the coil, or providing water cooling for the coil, or by utilizing a combination of armoring and water cooling. While devices of the character indicated may be satisfactorily utilized for the purposes intended, they do not always afford such a margin of safety as to insure the continued commercial operation of the apparatus without interruption such as may be occasioned by the necessity of making repairs, as a result of the tremendous and largely localized heat which is developed.

It is one of the objects of the present invention to provide an improved welding apparatus in which special provision is made for the more adequate cross diffusion of the heat generated along the line of weld. Another object of the invention is to make provision for the more effective carrying away of heat of the character referred to, so that not only is there better diffusion of the heat with consequent lowering of temperature, but a more effective conduction and convection of such heat away from the line of weld.

In accordance with the preferred embodiment of my invention, the foregoing and other objects are accomplished by the provision of a welding apparatus in which the primary coil is purposely made asymmetrical relative to a horizontal plane containing the longitudinal axis of the material which is substantially normal to the plane containing such axis and passing between the edges of the material being welded, or non-concentric with the contour of the formed material and so as to lie as far away as possible from such edges. This asymmetrical or non-concentric condition is conveniently obtained either by utilizing a coil of such special cross sectional shape as to provide a greater space between the coil and the material on the line-of-weld side of the formed up material, or by mounting the coil eccentrically of the axis of the formed material so as to accomplish a similar result.

Not only does the construction of the character referred to give improved results from the standpoint of length of life of the welding apparatus itself, but it has been found, in many cases at least, to give an improved welded article. This is particularly true in cases where the material being welded has not been subjected to an accurate operation such as would tend to maintain the edges in exactly the position desired. With apparatus as heretofore contemplated, and particularly apparatus of the character disclosed in my application before referred to in which the primary coil is located within the tubular material, and concentric with the axis of such material, special provision has had to be made to prevent the edges of said material from engaging the inner coil assembly and thereby establishing a short circuit between such edges. Such a result has conveniently been accomplished by the provision of special guiding projections effective by supporting one edge of the material and thereby holding the other edge also in spaced relation to the coil assembly. This holding operation has, however, resulted in a non-uniform support for the material such as would tend to move the edges out of a common plane and has, in some instances, resulted in a weld in which the edges were lapped or not squarely in engagement.

In accordance with the present invention, by providing a space of the character referred to adjacent the line of weld, possible contact of the edges of the material with the coil assembly is satisfactorily prevented and the provision of special supporting means for one of the edges is thereby obviated. This makes it possible to impose on other portions of the apparatus the duty not only of guiding the material through the apparatus, but of maintaining the desired relationship between the edges. In this manner it is possible to produce more accurate welds without the possibility of short circuiting of such nature as to create a flash between the electrically active edges of the tubular material and metal parts of the coil assembly, such as would result in a localized and injurious burning of such assembly.

Other advantages of the invention will be apparent from the accompanying drawings, in which I have shown more or less diagrammatically, for purposes of illustration only, certain preferred embodiments of my invention.

Figure 1:
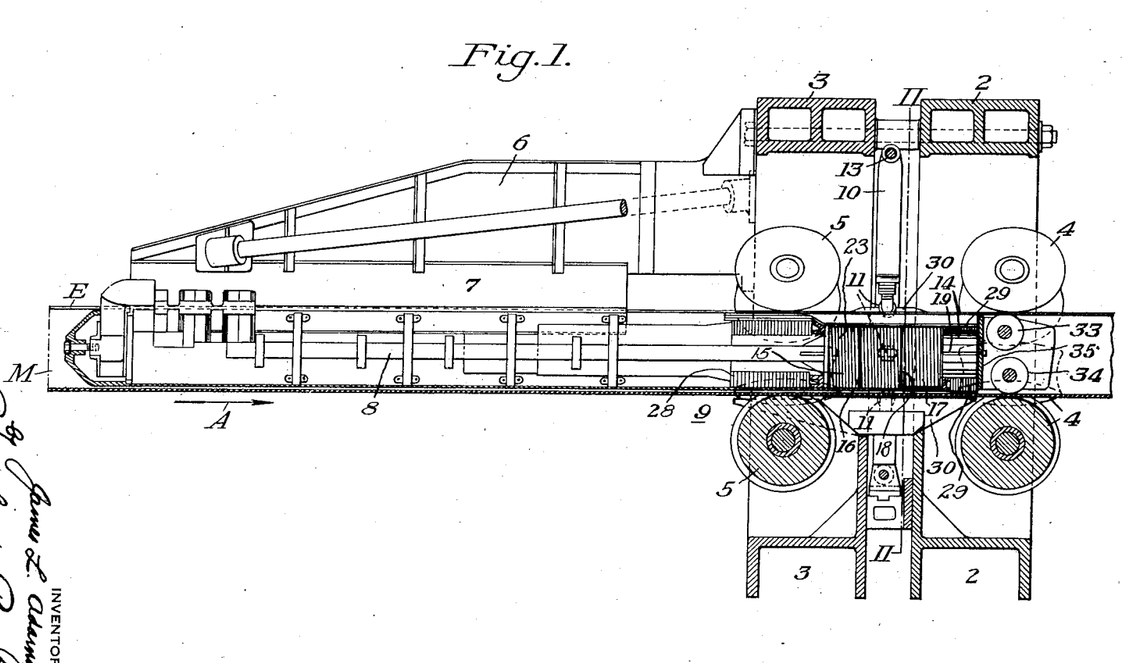
Figure 1 is a longitudinal sectional view through a portion of an apparatus constructed in accordance with the present invention.

In accordance with the preferred embodiment of my invention, the welding operation is preferably accomplished substantially entirely within or between two roll passes. In order to provide these roll passes, I conveniently utilize two main frames 2 and 3, each of which will hereinafter be referred to as housings. These two housings are generally similar in construction, the details of which while disclosed in my copending application above referred to, constitute no part of the present invention and are therefore omitted from the disclosure of this application for purposes of simplification, and to give a clearer understanding thereof. Each of the housings is, however, of such construction as to afford suitable supporting means for a series of rolls, some or all of which are preferably positively driven, whereby they afford a combined guiding and at least partial feeding system for the material being welded. In Figure 1, I have shown but three of such rolls 4 from the total number within the housing 2 and a similar number and arrangement of rolls 5 within housing 3.

Projecting rearwardly from the housing 3 and secured thereto in any desired manner is a supporting framework 6 to the lower side of which is preferably secured a relatively thin supporting plate 7, of suitable material. This supporting plate is secured to an extension 8 projecting from an inner coil and core assembly 9 which will hereinafter be described in greater detail, the primary purpose of the structure just described being to afford supporting means for maintaining the inner coil and core assembly in such position as to permit the guided passage thereover of the substantially tubular formed up material M being welded.

In the operation of the apparatus, the tubular material will be fed thereto in any desired manner with the adjacent edges E straddling the supporting plate 7, whereby the supporting plate or guide rolls mounted thereon may serve, if desired, as part of the means for maintaining the desired alignment of such tubular material. It will be understood, however, that any special means for this purpose may be provided at the will of the operator or designer of the apparatus.

As the material to be welded travels into the apparatus in a direction illustrated by the arrow A, the leading end thereof will be engaged by the rolls 5 in the housing 3. These rolls in addition to exerting a guiding and feeding action on the material will also be effective for crushing, sizing or shaping the material to the extent determined by the position to which they are adjusted. Conveniently, however, the adjustment may be such as to bring the edges of the material into abutting pressure relationship during the passage through the housing 3. After leaving the rolls 5 the natural tendency of the material will be such as to cause these edges to progressively separate. In order to control the amount or extent of such separation, for purposes which will be hereinafter more fully described, I may provide an intermediate frame 10 carrying a series of rolls 11 adapted to engage the material at spaced points around its periphery, assist in guiding the same, and control the extent of separation of the edges E.

Inasmuch as it may be desirable to control the amount of separation under different conditions of operation, the frame 10 is preferably of such construction as to be adjustable, such adjustment being conveniently afforded by hand wheel 12 extending through the upper portion of the frame and having such threaded engagement 13 therewith as to enable the frame to be contracted or expanded to thereby correspondingly move the rolls 11 toward or away from the axis of the material M and in this manner control accurately the space between the edges E of the material.

After leaving the rolls 11 in the intermediate frame 10, continued forward movement of the material will bring it into engagement with the rolls 4 in the housing 2, which rolls for purpose of convenience will hereinafter be referred to as welding rolls, since their primary function is to bring the edges of the material into abutting relationship under sufficient pressure to effect the weld, the edges of the material previously having been heated to such a temperature that the desired welding operation may be effected at this point.

This heating of the edges to a welding temperature is preferably accomplished by inducing in the material which, as before pointed out, serves as a movable secondary, a heating current of the desired magnitude. For inducing such a current, there is provided the inner coil and core assembly 9 which, as illustrated more particularly in Figures 1 and 2 comprises a center core 14, at least a portion of the length of which is surrounded by primary coil structure, this coil structure being herein illustrated as comprising sections 15, 16 and 17. These coil sections which are preferably in co-axial relationship one to the other, and which may be longitudinally spaced or separated from each other by suitable insulation 18, may be electrically connected in parallel to a suitable source (not shown) of periodically varying current, or may be connected in series, one with the other, with the different sections of the coil connected to successive taps on a suitable power or regulating transformer (not shown).

In either case, the effect will be to provide a series of sections each of which will operate at maximum efficiency as soon as the movable material has passed thereover to such an extent as to substantially enclose the same. In this manner the disadvantages of a single longitudinal inner coil, and its characteristic effect at such times as a portion only thereof is embraced in the material being welded, are obviated. This makes it possible with a given source of current to limit materially the shading off of current as the ends of the blank pass over the inductor and, therefore, to effect a greater energy input into such portions. The blank edges are thus heated to the desired welding temperature through a greater portion of their length, reducing the loss due to end scrap.

While I have herein illustrated each of the coil sections 15, 16 and 17 as being of substantially the same longitudinal dimensions, it will be understood by those skilled in the art that the length of the individual sections or the number of turns constituting the same may be varied as desired in order to obtain any particular operating characteristics which may be best suited to the material being welded.

Figure 2:
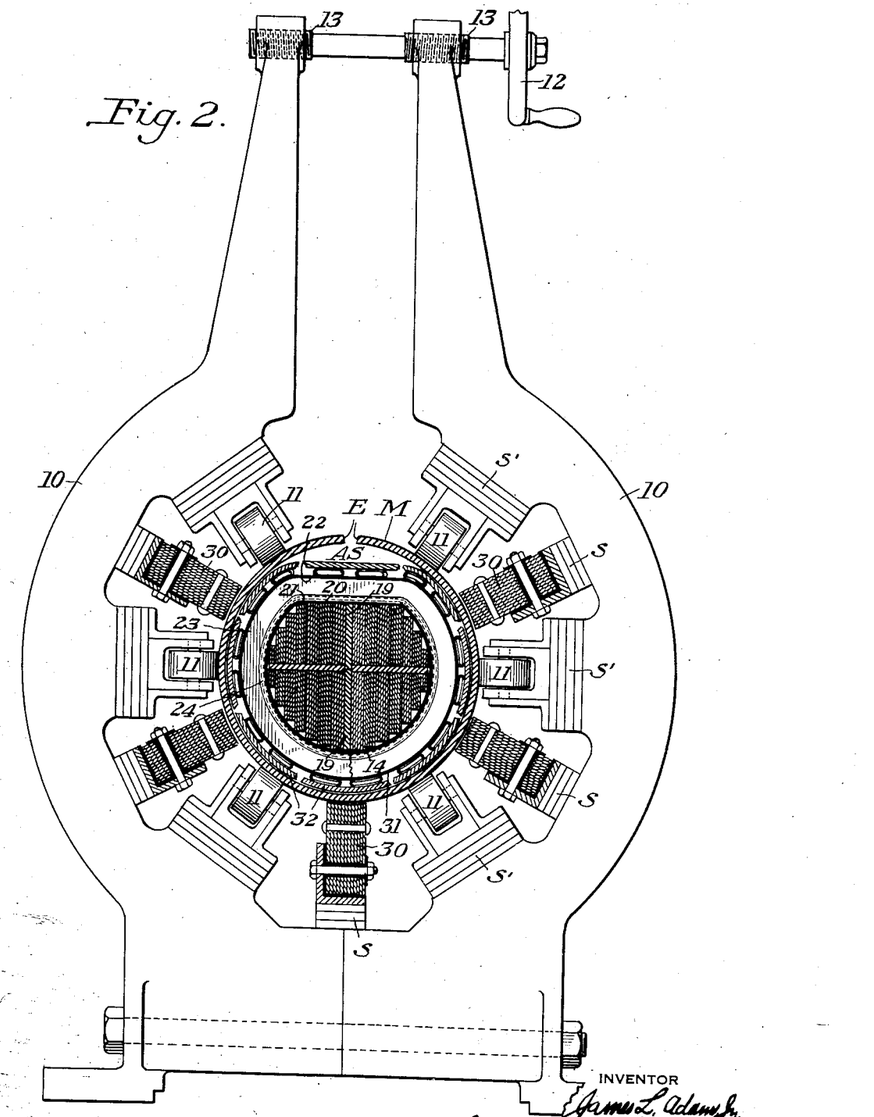
Figure 2 is a transverse sectional view, on an enlarged scale along the line II—II of Figure 1.

In order to afford the desired rigidity to the inner coil and core assembly the core may be built about a suitable supporting structure one form of which is illustrated in Figure 2 as comprising intersecting plates 19 of suitable characteristics disposed substantially at right angles, and preferably welded together. This form of core, while suitable for use with any coil and core assembly as contemplated herein, is only one of a number of different forms utilizable as hereinafter more fully described.

The core is further characterized by being asymmetrical on opposite sides of the substantially horizontally extending plate 19 shown in Figure 2, this asymmetrical relationship being obtained in accordance with this embodiment of the invention by providing a substantially flat top 20 on the core. Surrounding the core is a suitable sleeve 21 of insulating material around which the coil sections 15, 16 and 17 are preferably edgewise wound, the individual turns of the different coil sections conforming to the contour of the core whereby the coil sections provide substantially flat tops 22. The inner coil and core assembly is further so disposed with respect to the rest of the apparatus that the flat topped portions 22 lie below the spaced edges E of the material and at a greater distance from such edges than the distance between the remainder of each turn and the general inner surface of the material. This affords a construction in which the portion of the coil adjacent the region of maximum heat in the tubular material is at the greatest distance from such region, thereby affording a substantial air gap serving not only as a zone within which heat distribution and resultant lowering of temperature may take place, but as a partial heat insulating means for the coil sections in this region.

The coil sections as illustrated in Figure 2 preferably comprise edgewise wound copper straps or bars 23 each carrying an inner water cooling duct 24 suitably associated therewith, such duct providing convenient means for constantly cooling the coil sections. Edgewise wound, single layer windings give the minimum voltage between turns that is possible for any construction, and generally lower eddy current losses, much higher input into the tube; the highest possible insulation between turns, since flat high temperature mica plate can be used; and in general give the maximum possible area in the core, since the coil depth is less than for any multi-layer winding of equivalent energy capacity.

Figure 2A:
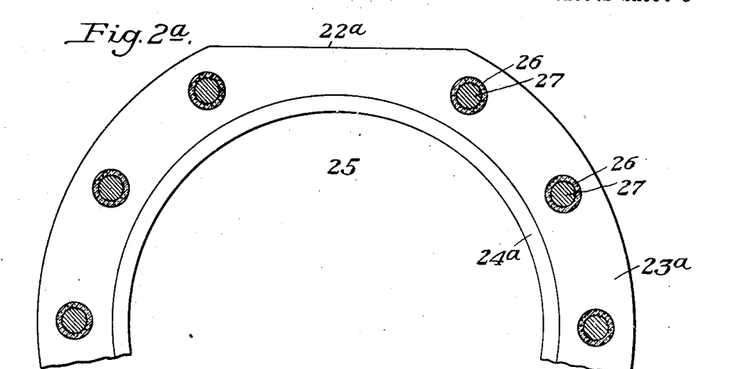
Figure 2a is a partial transverse sectional view similar to Figure 2, showing a slightly different form of my invention.

In Figure 2a there is illustrated another embodiment of the invention generally similar to that illustrated in Figure 2, but differing therefrom in that the ducts 24a for the individual windings 23a, and the windings themselves, are so shaped as to provide a substantially circular internal space 25 for the reception of a magnetic core of any desired construction. In order to afford the desired spacing between the coils and the region of maximum temperature as before described, the coils themselves may be milled or otherwise cut away to afford substantially a flat top 22a. This milling or other planing or cutting away of the coil may be accomplished either before or, better, after the winding of the coils is completed. The individual windings may be provided with suitable perforations such as drilled holes through which may be passed tubes 26 of mica or other insulating material within which may extend bolts 27 effective for solidly tying the windings and assembly together, this giving an exceptionally rigid and vibration resisting construction, it being apparent that suitable high temperature plate mica or equivalent insulation is provided between the adjacent windings to prevent the same from coming into electrical engagement one with the other.

Referring again to Figure 1 of the drawings, the inner coil and core assembly may comprise, in addition to the core 14 and the coil sections 15, 16 and 17, pole pieces 28 and 29, these pole pieces being preferably located adjacent opposite ends of the coil assembly. Cooperating with these pole pieces and with the inner assembly as a whole, are laminated yokes 30 constituting a return magnetic circuit for the inner coil and core assembly. As illustrated in Figure 2 of the drawings these yokes are carried by the intermediate frame 10 in alternating relationship to the rolls 11. Each of the yokes 30 preferably comprises a series of laminations spaced from the outer surface of the material M, with each of the laminations extending in a substantially radial direction, the ends of the laminations being so shaped as to extend as closely adjacent the rolls 4 and 5 as possible in order to thereby afford an effective magnetic return path.

In Figure 2 of the drawings the laminated yokes are shown as secured to the intermediate frame in such spaced relationship thereto as may be determined by insulated shims s whereby upon changing the number of shims, radial adjustment of the yokes is afforded as may be desired for changes in size of pipe to be welded. In like manner the rolls 11 in the intermediate frame are shown as carried by similar shims s' which function in the same manner, thereby permitting the yokes and rolls to be moved inwardly or outwardly as required for any particular set of operating conditions.

By reference to Figure 2 of the drawings it will be seen that the two uppermost yokes 30 are on opposite sides of the seam and also on opposite sides of the flat top 22 of the coil. This position is desirable for the reason that while it is impossible to very materially control magnetic leakage through the air space AS afforded by reason of the flat top coils, the two yokes in question do have a tendency to divert the main magnetic flux away from the seam areas and thereby correspondingly decrease the electrical heating of metal parts necessarily lying immediately under the seam.

The inner coil and core assembly as illustrated in Figures 1 and 2 may be enclosed within a suitable shell or sleeve of insulating material 31 which is in turn surrounded by protecting armor 32 of suitable construction and hereinafter described in greater detail.

Figure 3:
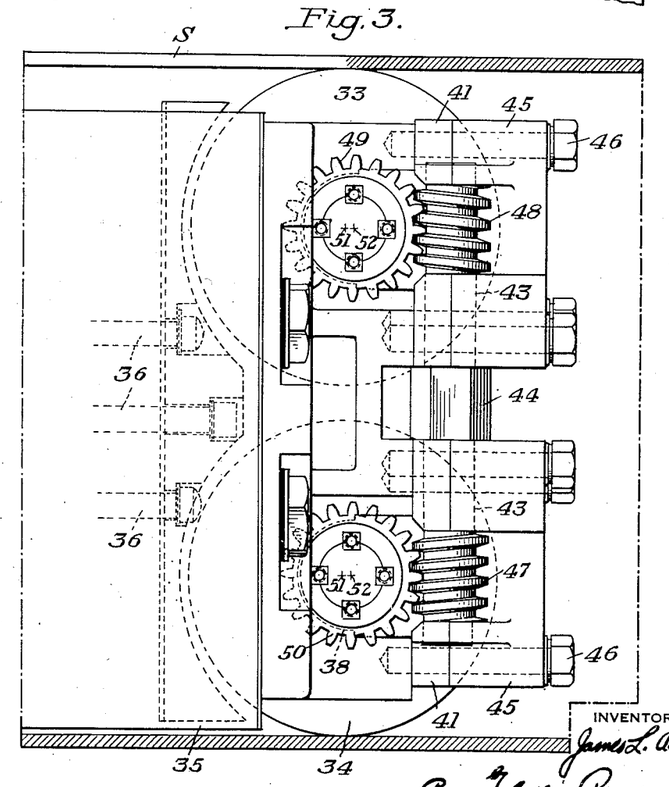
Figure 3 is a detail elevational view, on an enlarged scale, of a portion of the apparatus shown in Figure 1.
Figure 4:
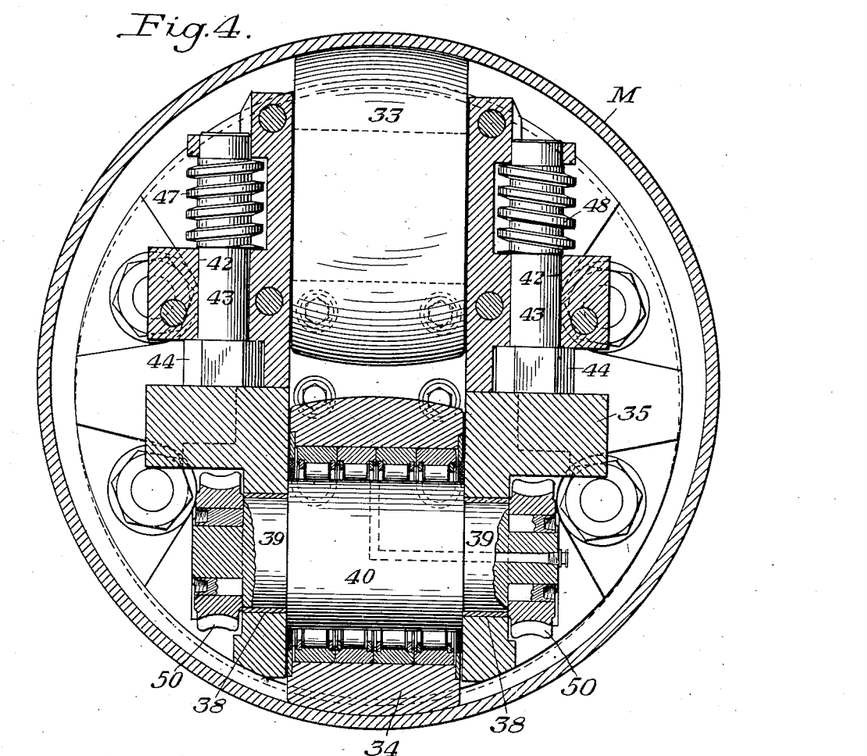
Figure 4 is a transverse sectional view through the structure of Figure 3, certain of the parts being shown in elevation.

By reference more particularly to Figure 1 of the drawings it will be apparent that the free or projecting end of the assembly 9 is provided with inside welding rolls 33 and 34, these rolls and their mounting being illustrated in detail in Figures 3 and 4. As illustrated in the drawings, there is provided a suitable housing 35 for these rolls which housing is set into the free end of the core 14 and solidly bolted or otherwise secured thereto as by means of suitable bolts 36.

The housing 35 is shaped to provide semi-cylindrical seats 38 adapted to receive the ends 39 of shafts 40. Cooperating with the seats 38 are adjustable seats 41 serving as caps for the seats 38. The cap seats 41 are in turn provided with bearing seats 42 adapted to receive an adjusting shaft 43, having formed on the intermediate portion thereof a body 44 of suitable angular cross-section such as hexagonal to accommodate a wrench or other means for rotating the shaft. Cooperating with the cap seats 41 are caps 45 through which extend bolts 46, these bolts being effective when tightened to clamp the adjusting shaft 43 and also ends 39 of the shafts 40 so as to absolutely prevent any undesired rotation thereof. When loosened it will be apparent that rotation of these parts is permitted. Rotation of the adjusting shaft 43 is transmitted to the shafts 40 by the provision of a right hand worm 47 adjacent one end of the shaft 43 and a similar left-hand worm 48 adjacent the opposite end of the shaft, these worms meshing with corresponding worm wheels 49 and 50 on the shafts 40.

As apparent from Figure 4 of the drawings, the construction just described is symmetrical on opposite sides of the rolls 33 and 34 whereby the opposite ends of the shafts 40 for these rolls may be adjusted outwardly or inwardly at the pleasure of the operator. This adjustment is obtained by making the axes 51 of the shafts 40 eccentric to the axes 52 of the end portions 39, whereby rotation of the shafts 40 will effect the desired adjustment of the rolls 33 and 34. This enables the rolls to be adjusted to such a position as not only to support the free end of the coil and core assembly but to afford an effective internal pressure in opposition to the welding pressure exerted by the welding rolls 4. It also enables the apparatus to be utilized with material having different internal diameters and thicknesses.

Figure 5:
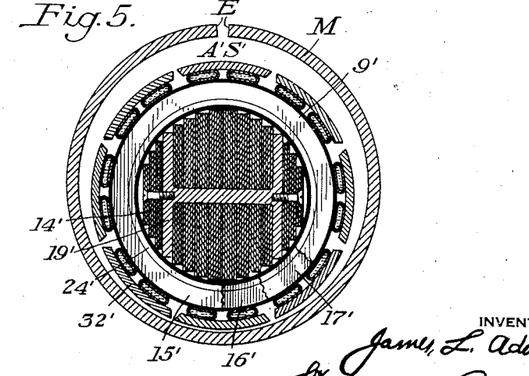
Figure 5 is a view similar to Figure 2 illustrating another embodiment of the invention.

Figure 5 is a transverse section of a machine similar to Figure 2, but differing therefrom in that the inner coil and core assembly 9' while symmetrical about its own axis is eccentrically disposed with respect to the axis of the tubular material in such manner that the coil sections 15', 16' and 17' are asymmetrical on opposite sides of a horizontal, axial plane substantially normal to an axial plane passing between the edges of the material. In this figure of the drawings, parts corresponding to parts already described are designated by the same reference characters, having, however, a prime affixed thereto. The eccentric position of the coil sections is such as to provide the maximum air space A'S' above the coil sections and below the seam, the effect in this respect corresponding to that of the flat topped structures before described. With this embodiment of the invention the initial eccentricity may be obtained by the relative initial setting of the rolls 33' and 34' while the subsequent adjustment of these rolls may still be effective for accommodating different tube diameters and wall thicknesses, or for changing the eccentric relationship.

Where the eccentric form of assembly is utilized, the construction of the inner coil and core assembly will preferably be such that the extension which supports the same and corresponding to the extension 8 of Figure 1 will retain its concentric relationship to the material. Such concentric extension will carry the coil and core assembly not only in eccentric relationship to itself, but in eccentric relationship to the tubular material. This is of advantage in that it enables the guiding rolls which first engage the material, to be spaced equally in a radial direction. This is obviously advantageous both from the standpoint of building and assembling of the apparatus.

In Figure 5 the core 14' is illustrated as being carried by a supporting structure 19' of generally H beam construction.

Figure 6:
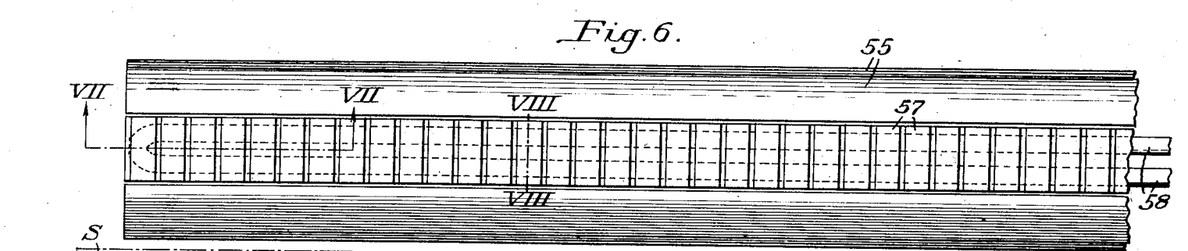
Figure 6 is a top plan view of a slightly modified form of inner coil and core assembly.
Figures 7, 8, 9:
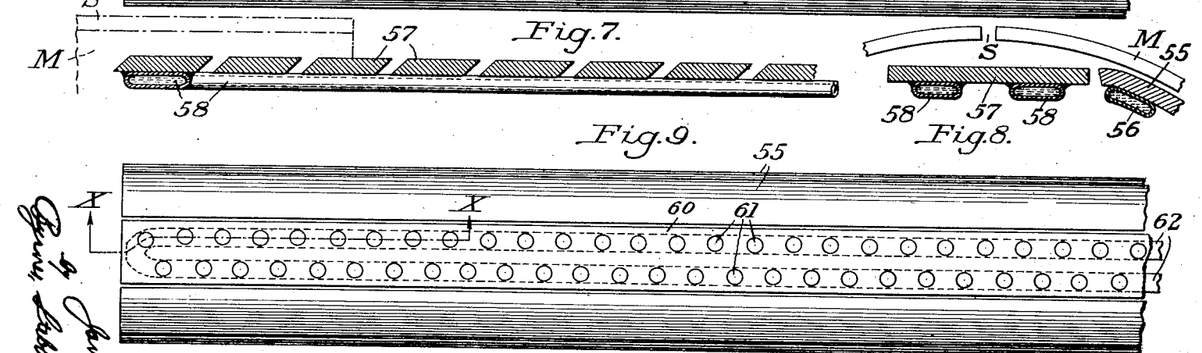
Figure 7 is a longitudinal sectional view, on an enlarged scale, along the line VII—VII of Figure 6.
Figure 8 is a transverse sectional view on an enlarged scale along the line VIII—VIII of Figure 6.
Figure 9 is a view similar to Figure 6 illustrating still another embodiment of the invention.

In Figure 6 of the drawings there is illustrated in top plan view a preferred form of armoring means for an inner coil and core assembly. This armoring means, as to the main portion thereof may comprise a series of longitudinally extending high resistance and non-magnetic metal slats 55 suitably secured in position and, as illustrated in Figure 8 each provided with water cooling means 56 directly welded thereto. The portion of the armor adjacent the seam S is, however, usually of special construction and preferably comprises a series of transversely extending cross-strips or bars 57 spaced at their opposite ends from the adjacent slats 55.

As illustrated in Figure 7, the opposite sides of the cross-strips 57 are beveled so as to extend in overlapping relationship in such manner as to provide a smooth exterior and afford a construction in which a partial interlocking of the cross-strips is afforded. The direction of extension of the tapered sides is such as to prevent the formation of abrupt shoulders, such as would serve to prevent the free forward passage of the tubular material thereover. These cross-strips or bars, which are conveniently of such material as will give a high coefficient of heat conductivity, such as copper, may in turn be copper welded or otherwise secured to a suitable water cooling duct or ducts 58. These high heat conducting cross-strips or bars immediately below the seam and at the maximum distance therefrom afforded either by the flat topped coil construction, or the eccentric mounting of the inner assembly, provide efficient means for rapidly absorbing heat and distributing the same over a maximum area to the water cooling means. There is thus afforded a triple protection to the inner assembly, since the added air space serves initially as a partial heat insulating and distributing medium and the copper bars or slats as highly heat conducting and transverse distributing means, as well as temporary partial storage means, for the heat which has passed through such medium. By utilizing narrow and very slightly spaced cross-strips instead of a continuously extending copper plate, eddy currents and consequent electrical heating therein are reduced to a minimum, and the "flash" spittings produced do not tightly adhere to copper.

Figure 10:
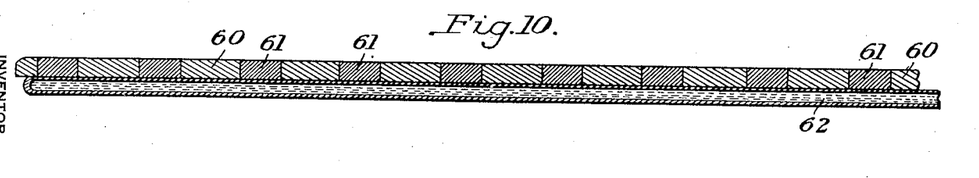
Figure 10 is a longitudinal sectional view on an enlarged scale along the line X—X of Figure 9.

In Figures 9 and 10 there is illustrated still another embodiment of the invention in which the cross-strips 57 are replaced by a longitudinally extending slat 60 preferably of high electrical resistance and non-magnetic material such as Monel metal or manganese steel. This slat, however, is provided with a series of plugs or inserts 61 of copper or other high heat conducting material, serving to rapidly transmit heat to the water cooling duct or ducts 62 provided on the under surface of the slat, to which ducts said plugs are preferably copper welded.

To those skilled in the art it will be apparent that the slats 55 utilized in the embodiment of my invention illustrated in Figures 6, 7, and 8 will also preferably be of suitable high resistance and non-magnetic material, such as manganese steel or Monel metal to thereby reduce eddy currents to a minimum.

It will also be appreciated by those skilled in the art that the present invention provides maximum heat and mechanical protection for the coil and core assembly, this protection being particularly desirable where the assembly is, as herein illustrated and described, located within the material to be welded as distinguishing from a location external of the said material.

Certain advantages of this invention result not only from the maximum spacing of the coil and core assembly from the position of greatest heat, but also from the means afforded for effecting very rapid transverse distribution or dissemination as well as some temporary storage of such heat, and the final conduction of the same to a suitable cooling medium.

Still other advantages of the invention arise from the provision of means for adjusting the relative position of the coil and core assembly and the material being welded.

While I have herein illustrated and described certain preferred embodiments of my invention, it will be apparent that changes in the construction and operation of the parts may be made without either departing from the spirit of the invention or the scope of my broader claims.

I claim:

1. In a welding apparatus, means for longitudinally feeding substantially tubular material to be welded, a coil, means for supporting the coil, and means for producing relative movement between the same and said material, said coil having the peripheral portion thereof adjacent the proposed line of weld spaced a greater distance from the tubular material than the other portions.

2. In a welding apparatus, a coil and core assembly, armoring means for said assembly discontinuous in a direction peripherally thereof, water cooling means for said armoring means, and means increasing the heat conductivity of a portion of said armoring means.

3. In a welding apparatus, a coil and core assembly, means for armoring said assembly, water cooling means for said armoring means, and means increasing the heat conductivity of a portion of said armoring means, said last mentioned means including a plurality of copper heat conducting bodies extending through the armoring means and into heat conducting relationship to the cooling means.

4. In a welding apparatus for the welding of substantially tubular material having the edges thereof in adjacent relationship to define the line of weld, means cooperating with the material for inducing a current flow therein, and means for effecting a greater heat removal from said first mentioned means adjacent the line of weld than adjacent the remaining portions thereof.

5. In a welding apparatus, a plurality of spaced roll passes, a series of laminated yokes intermediate said passes, and a coil within said yokes, said coil and yokes having their major axes extending in the same direction.

6. In a welding apparatus, a plurality of lengthwise extending yokes circumferentially spaced about a common axis, and a coil within said yokes and asymmetrical relative to said axis to provide a maximum spacing for the coil adjacent the proposed line of weld.

7. In a welding apparatus, a plurality of lengthwise extending yokes circumferentially spaced about a common axis, and a coil within said yokes and asymmetrical relative to said axis to provide a maximum spacing for the coil adjacent the proposed line of weld, said coil and yokes having their major axes extending in the same direction.

8. In a welding apparatus, a plurality of lengthwise extending yokes circumferentially spaced about a common axis, means for adjusting said yokes toward or from said axis, and a coil within said yokes and asymmetrical relative to said axis to provide a maximum spacing for the coil adjacent the proposed line of weld.

9. In a welding apparatus, a plurality of lengthwise extending yokes circumferentially spaced about a common axis, means for adjusting said yokes toward or from said axis, and a coil within said yokes and asymmetrical relative to said axis to provide a maximum spacing for the coil adjacent the proposed line of weld, said coil and yokes having their major axes extending in the same direction.

10. In a welding apparatus, a series of laminated yokes having a series of material engaging means alternating therewith, and a coil within said yokes, said coil and yokes having their major axes extending in the same direction.

11. In a welding apparatus, a series of radially extending laminated yokes in spaced relationship, a series of radially extending material engaging rollers intermediate said yokes, and a coil within said yokes and rollers, said coil and yokes having their major axes extending in the same direction.

12. In a welding apparatus for effecting a weld between the edges of preformed substantially tubular material, a coil for inducing heating current in the material and mounting means for said coil providing a greater distance from said material and said coil adjacent said edges than adjacent the remainder of the periphery of said material.

13. In a welding apparatus for effecting a weld between the edges of preformed substantially tubular material, a coil for inducing heating current in the material, mounting means for said coil providing a greater distance from said material and said coil adjacent said edges than adjacent the remainder of the periphery of said material, and subdivided high resistance water cooled metal for protecting said coil from the heat induced in said material.

14. In a welding apparatus, a coil and core assembly, armoring means for said assembly comprising a series of longitudinally extending slats in spaced relationship around said assembly, and cooling means for said armoring means.

15. In a welding apparatus, a coil and core assembly, armoring means for said assembly comprising a series of longitudinally extending slats in spaced relationship around said assembly, and cooling means for said armoring means, said slats being of non-magnetic material having a series of heat conducting members disposed therein.

16. In a welding apparatus, a coil and core assembly comprising a frame having plate-like portions disposed at substantially right angles, core laminations disposed upon said frame to form a core and an inducing coil wound upon said core, said assembly being adapted to be embraced by a formed tube blank having an axial seam cleft therein.

17. In an apparatus for welding together the edges of formed-up tubular blanks, means including spaced roll stands for advancing the blanks, an inducing coil and means for supporting the coil in position to be embraced by the advancing blanks substantially between said stands, and a plurality of yokes supported adjacent the path of the advancing blanks and extending axially thereof between said stands to provide a return magnetic path for the coil.

18. In a welding apparatus, means for advancing the material to be welded, a coil on one side of the material for inducing welding current in the material, a plurality of yokes disposed on the opposite side of the material from the coil and extending along the path of travel of the material overlapping said coil, for providing a return magnetic circuit therefor, and means between said yokes having guiding engagement with said material.

19. In an induction welding apparatus, a power driven roll stand for advancing a tubular blank to be welded, an inducing coil adjacent said stand, means for supporting the coil in position to be embraced by said blank, a plurality of laminated yokes supported in circumferentially spaced relation about the pass of said roll stand for embracing the blank, said yokes being formed at one end to extend at least partially into said pass, and means for adjusting the yokes radially of the pass.

20. A core for an inducing coil adapted for mounting as a cantilever within the coil, said core comprising a vertical plate, and two horizontally extending plates secured one on each side to said vertical plate, sheets of magnetic material disposed on each side of the vertical plate and above and below the horizontal plates, and means for securing said sheets in place and in fixed relation to said vertical and horizontal plates.

21. An inductive pipe-welding device having a frame and spaced sets of leading guide and trailing pinch rolls in said frame for supporting and moving through said frame a pipe blank to be welded, a laminated core structure and an energizing coil thereon both located coaxially with the pipe blank and the sets of rolls and ahead of the pinch rolls, the coil being flattened adjacent to the line of the seam of the pipe, and a cooling element located between the coil and the pipe at the flattened portion of the coil.

22. An inductive pipe-welding device having spaced sets of leading guide and trailing pinch rolls for supporting and moving a pipe-blank to be welded, a laminated core and an energizing coil embracing said core, both located between and coaxially of said sets of rolls, said coil being curved away from such blank adjacent the line of seam thereof, and a cooling element located between such seam and said coil.

23. An inductive pipe-welding device having a frame and spaced sets of leading guide and trailing pinch rolls in said frame for supporting and moving through said frame a pipe blank to be welded, a laminated core structure and an energizing coil embracing the same both located coaxially with and in inductive relation to the pipe blank traversing said frame and ahead of said pinch rolls, the coil being curved away from the pipe blank adjacent the line of seam thereof, and a fluid cooling means including a metallic element for rapidly conducting away the heat generated at the seam of such pipe blank, said element being located between such pipe blank being welded and the curved away portion of said coil.

24. An electromagnetic heating device for heating metallic objects to welding temperature by induction, comprising a core of magnetizable material, and a coil disposed about said core for inducing welding current in said objects progressively as they move past the core, said coil being spaced farther from certain portions of the objects passing the core than from the other portions thereof in order to provide a relatively large clearance space between the coil and the surface of the portion of the material being heated to welding temperature.

25. An inductive pipe-welding machine having a frame and spaced sets of leading guide and trailing pinch rolls in said frame for supporting and moving through said frame a pipe blank to be welded, a laminated core structure and an energizing coil both located coaxially with the pipe blank and the sets of rolls and ahead of said pinch rolls, the coil being curved away from the pipe blank adjacent the line of the seam thereof, and a cooling element located between said coil and the pipe blank adjacent said curved away portion of said coil.

26. An inductive pipe-welding device having spaced sets of leading guide and trailing pinch rolls for supporting and moving through the device a pipe-blank to be welded, a laminated core and an energizing coil embracing said core, both located between and coaxially of said sets of rolls, said coil being curved away from such pipe-blank adjacent the line of the seam therein, and a cooling element located between the pipe-blank seam and the curved away portion of the coil.

JAMES L. ADAMS, Jr.